United States Patent [19]

Hanke

[11] 3,724,462
[45] Apr. 3, 1973

[54] WATER-DISPERSIBLE INSERTION DEVICES FOR TAMPONS AND THE LIKE

[75] Inventor: David E. Hanke, Neenah, Wis.

[73] Assignee: Kimberly-Clark Corporation, Neenah, Wis.

[22] Filed: Nov. 1, 1971

[21] Appl. No.: 194,694

[52] U.S. Cl.................................................128/263
[51] Int. Cl..............................................A61f 15/00
[58] Field of Search.......................128/263, 270, 285

[56] References Cited

UNITED STATES PATENTS 2,509,241  5/1950  Mende...................................128/263
3,015,332  1/1962  Brecht....................................128/263

FOREIGN PATENTS OR APPLICATIONS 260,512  5/1963  Australia...............................128/263

Primary Examiner—Charles F. Rosenbaum
Attorney—Daniel J. Hanlon, Jr. et al.

[57] ABSTRACT

Improved water-dispersible insertion devices for tampons, suppositories and the like of the type which comprises a pair of telescoping plastic tubes made from plastic sufficiently sensitive to water to be softened in the presence thereof. One of the tubes is made from a type of water-sensitive plastic material which is different from the material used for the other tube. In addition, the plastic material of one tube is incompatible with the plastic material of the other tube.

8 Claims, No Drawings

WATER-DISPERSIBLE INSERTION DEVICES FOR TAMPONS AND THE LIKE

BACKGROUND OF THE INVENTION

Prior to this invention, it was suggested that tampon insertion devices of the type which comprise a pair of telescoping tubes may be made from water-soluble polymers, thus enabling the tubes to be disposed of in water closets. Preferably the tubes are made of thermoplastic polymers of the water-soluble type compounded with water-insoluble fillers. The fillers are employed among other reasons to stabilize the water-soluble plastic in the event it is exposed to high humidity and high temperature conditions. While such filler compounded polymers are an improvement over non-compounded polymers in this regard, it has been found that sometimes even these improved products may fuse together due to moisture absorption when exposed to extremes in humidity conditions as well as the elevated temperatures often encountered during shipping and storage. This is especially true with respect to tubes in which cooperating portions of the usual tube interlocking device are in firm physical contact with one another.

This application is directed to an improvement in structure which overcomes this difficulty.

SUMMARY OF THE INVENTION

The basic concept of this invention is to provide a telescoping pair of water-dispersible or water-soluble plastic tubes in which each of the tubes are comprised of a different type of water-sensitive plastic material which softens in the presence of water and in which the plastic material of one tube is incompatible with the plastic material of the other tube. In its broadest context the tubes of the invention may comprise simply two water-soluble plastics of different but non-compatible material. In its preferred embodiment, at least one of the plastics is thermoplastic and is compounded with a water-insoluble filler.

DETAILED DESCRIPTION

EXAMPLE 1

A pair of telescoping tubes are made from water-dispersible plastic material comprising 100 parts by weight of a hydroxypropyl cellulose polymer having a molecular weight of about 75,000, and 100 parts by weight of talc. The tubes are slidably disposed in telescoping association in which the outer wall of the inner tube is in frictional contact with the inner wall of the outer tube. When the telescopically associated tubes are then subjected to a temperature of about 120°F and a relative humidity of about 90 percent for an extended period some fusion will develop between the contacting surfaces of the tubes. The bond which develops makes it difficult to telescope one tube within the other.

EXAMPLE 2

Another pair of telescoping tubes are made from a water-dispersible plastic material comprised of 100 parts by weight of polyethylene oxide having a molecular weight of about 600,000, 50 parts by weight of talc, and four parts ethylene glycol. When these tubes are subjected to the same extreme humidity and temperature conditions specified in Example 1 a similar degree of fusion develops between contacting surfaces of the paired tubes.

EXAMPLE 3

When outer tubes of the Example 1 hydroxypropyl cellulose material are slidably associated with inner tubes of the Example 2 polyethylene oxide material, or when outer tubes of the Example 2 material are slidably associated with inner tubes of the Example 1 material, and these combinations are subjected to the same humidity and temperature conditions defined above, no fusion or sticking will be found between these telescoping tube structures. This is ascribed to the fact that one tube is of a different water-sensitive plastic than the other. Further, when aqueous solutions of these two plastics are mixed together and left undisturbed a physical separation of the solutions take place, confirming that the two materials are mutually incompatible.

EXAMPLE 4

When inner tubes fabricated from water-soluble polyvinyl alcohol without filler are slidably associated with (1) outer tubes of the hydroxypropyl cellulose construction defined in Example 1, or (2) the polyethylene oxide defined in Example 2, and the tube combinations are subjected to the same humidity and temperature conditions previously described, the polyvinyl alcohol develops a somewhat sticky surface. Nevertheless, no fusion will be found between inner tubes of polyvinyl alcohol and outer tubes of either the hydroxypropyl cellulose or the polyethylene oxide. In addition the two sets of tubes will still telescope without difficulty. Even when the surface of the polyvinyl alcohol is dried to a non-sticky condition no fusion of the tubes will be found. The phenomenon of non-compatibility between the combination of plastics described in this example was further confirmed in the laboratory by mixing aqueous solutions of these plastics together whereupon physical separation occurred when the mixture was left standing.

EXAMPLE 5

When outer tubes made of the polyethylene oxide without filler are matched with inner tubes made of the polymer of hydroxypropyl cellulose without filler and exposed to high humidity and temperature, there is no fusion between tubes. Solutions of these plastics when mixed together also physically separate upon standing.

EXAMPLE 6

When outer tubes of the polymer of hydroxypropyl cellulose are matched with inner tubes of a polymer of hydroxypropylmethyl cellulose and exposed to high humidity and temperature, some fusion will occur. Accordingly these two plastics are compatible with each other and therefore unsuitable for the defined use. In laboratory tests physical mixtures of these polymers in aqueous solution did not separate when left standing which also confirmed this undesirable result.

EXAMPLE 7

When an outer tube of water-soluble polyvinyl alcohol is slidably mated with an inner tube made of hydroxypropylmethyl cellulose and the two subjected to high humidity and temperature fusion does not take place indicating that this combination of plastic tube structures is also suitable for use in accordance with the invention.

EXAMPLE 8

When an outer tube of water-soluble polyvinyl alcohol is slidably mated with an inner tube of a polyethylene oxide polymer and the two subjected to high humidity and temperature there is again no fusion, indicating incompatibility between the plastics and making them suitable for use in accordance with this invention. It will readily be seen that a number of water-soluble plastics capable of being formed into thin wall tubes may be employed in this invention. The main criteria is that the plastic in one tube in addition to being of a different water-sensitive material than the other tube must also be incompatible therewith.

It is also evident that water-soluble or dispersible plastics other than those specifically described in the Examples, and which are mutually incompatible with each other may be used as described.

While thermoplastic materials are preferred because tubes may more readily be fabricated therefrom, other water-sensitive plastics capable of being formed into tubes may be used.

What is claimed is:

1. In an insertion device for tampons, suppositories and the like which comprises a pair of telescoping tubes made of plastic material which softens in the presence of water, the improvement wherein one of the tubes is made up with a different type of water-sensitive plastic than the other tube and the plastic material used for one tube is incompatible with the plastic material used for the other tube.

2. The insertion device of claim 1 wherein each of said plastics are compounded with water-insoluble filler.

3. The insertion device of claim 1 wherein at least one of said plastics comprises a thermoplastic water-soluble plastic compounded with a water-insoluble filler.

4. The insertion device of claim 1 wherein one of the tubes is comprised of an hydroxypropyl cellulose polymer and the other tube is comprised of polyethylene oxide polymer.

5. The insertion device of claim 1 wherein one of the tubes is comprised of an hydroxypropyl cellulose polymer and the other tube is comprised of polyvinyl alcohol.

6. The insertion device of claim 1 wherein one of the tubes is comprised of a polymer of polyethylene oxide and the other tube is comprised of polyvinyl alcohol.

7. The insertion device of claim 1 wherein one of the tubes is comprised of a polymer of hydroxypropylmethyl cellulose and the other tube is comprised of polyvinyl alcohol.

8. The insertion device of claim 1 wherein one of the tubes is comprised of a polymer of hydroxypropylmethyl cellulose and the other tube is comprised of a polyethylene oxide polymer.

* * * * *